US011355111B2

(12) United States Patent
Kolavennu et al.

(10) Patent No.: US 11,355,111 B2
(45) Date of Patent: Jun. 7, 2022

(54) VOICE CONTROL OF AN INTEGRATED ROOM AUTOMATION SYSTEM

(71) Applicant: Honeywell International Inc., Morris Plains, NJ (US)

(72) Inventors: Soumitri Kolavennu, Blaine, MN (US); Ryan Gardner, Niantic, CT (US); Michael R. Sobanko, Oakdale, CT (US); Scott Knecht, Norwich, CT (US); Arun Mahasenan, Trivandrum (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/795,466

(22) Filed: Feb. 19, 2020

(65) Prior Publication Data
US 2020/0184972 A1 Jun. 11, 2020

Related U.S. Application Data

(63) Continuation of application No. 15/877,929, filed on Jan. 23, 2018, now Pat. No. 10,614,804.

(Continued)

(51) Int. Cl.
*G10L 15/22* (2006.01)
*G10L 15/30* (2013.01)
(Continued)

(52) U.S. Cl.
CPC .............. *G10L 15/22* (2013.01); *G10L 13/00* (2013.01); *G10L 15/08* (2013.01); *G10L 15/30* (2013.01);
(Continued)

(58) Field of Classification Search
CPC ..... G10L 15/22; G10L 2015/223; G10L 17/00; G10L 17/22; G07C 9/00563; G07C 9/00904; H04L 12/2816
(Continued)

(56) References Cited

U.S. PATENT DOCUMENTS

| | | | | |
|---|---|---|---|---|
| 3,906,447 A | * | 9/1975 | Crafton | G07C 9/00904 235/382.5 |
| 4,760,393 A | * | 7/1988 | Mauch | G07C 9/00571 340/5.54 |

(Continued)

FOREIGN PATENT DOCUMENTS

| | | | | |
|---|---|---|---|---|
| AU | 2017210578 A1 | | 8/2017 | |
| EP | 0417474 A1 | * | 3/1991 | ............. G07F 7/00 |
| EP | 0986808 B1 | | 2/2002 | |

OTHER PUBLICATIONS

Elizabeth Segran, "Introducing The First Voice-Activated Hotel Room," Fast Company, Business + Innovation, pp. 1-7, Aug. 24, 2016.

(Continued)

*Primary Examiner* — Martin Lerner
(74) *Attorney, Agent, or Firm* — Seager, Tufte & Wickhem, LLP

(57) ABSTRACT

A voice controlled room automation system that includes a speaker device situated in a guest room, a hotel automation controller operatively coupled to one or more components in the guest room, and a web service operatively coupled to the speaker device and the hotel automation controller. The web service is configured to receiving voice commands from the speaker device, process the voice command using speech recognition, interpret the voice command to determine a corresponding command for the hotel automation controller, and transmit the corresponding command to the hotel automation controller. The hotel automation controller is con- (Continued)

figured to receive the corresponding command from the web service, and to carry out the corresponding command by interacting with one or more of the components in the room. In some cases, the hotel automation controller may be configured to initiate an announcement or query on the speaker device via the web service.

8 Claims, 15 Drawing Sheets

Related U.S. Application Data

(60) Provisional application No. 62/449,968, filed on Jan. 24, 2017.

(51) Int. Cl.
  *H04L 67/025* (2022.01)
  *H04L 12/28* (2006.01)
  *G10L 15/08* (2006.01)
  *G10L 13/00* (2006.01)

(52) U.S. Cl.
  CPC ........ *H04L 12/2816* (2013.01); *H04L 67/025* (2013.01); *G10L 2015/088* (2013.01); *G10L 2015/223* (2013.01)

(58) Field of Classification Search
  USPC ....... 704/246, 270, 275; 340/5.2, 5.21, 5.25, 340/5.27; 705/5
  See application file for complete search history.

(56) References Cited

U.S. PATENT DOCUMENTS

| | | | |
|---|---|---|---|
| 5,567,926 A * | 10/1996 | Asher ..................... G07F 9/026 | 235/382 |
| 5,979,754 A * | 11/1999 | Martin ............... G07C 9/00571 | 235/382 |
| 6,052,666 A | 4/2000 | Diehl et al. | |
| 6,408,272 B1 | 6/2002 | White et al. | |
| 6,952,155 B2 * | 10/2005 | Himmelstein ......... G07C 9/257 | 340/5.52 |
| 6,988,070 B2 | 1/2006 | Kawasaki et al. | |
| 7,031,438 B1 | 4/2006 | Cheston, III et al. | |
| 7,447,635 B1 | 11/2008 | Konopka et al. | |
| 7,546,946 B2 * | 6/2009 | Hefner ................. G06K 19/083 | 235/375 |
| 7,831,426 B2 | 11/2010 | Bennett | |
| 7,933,777 B2 | 4/2011 | Koll | |
| 7,957,974 B2 | 6/2011 | Cho et al. | |
| 8,321,444 B2 | 9/2012 | Mowatt et al. | |
| 8,340,975 B1 | 12/2012 | Rosenberger | |
| 8,346,794 B2 | 1/2013 | Cheng et al. | |
| 8,396,710 B2 | 3/2013 | White et al. | |
| 8,666,963 B2 | 3/2014 | Sejnoha et al. | |
| 8,818,789 B2 | 8/2014 | Abir | |
| 8,831,957 B2 | 9/2014 | Taubman et al. | |
| 8,868,428 B2 | 10/2014 | Gruenstein et al. | |
| 9,058,390 B2 | 6/2015 | Barve et al. | |
| 9,472,205 B2 | 10/2016 | Kolavennu et al. | |
| 9,495,962 B2 | 11/2016 | Govrin et al. | |
| 9,542,956 B1 | 1/2017 | Nostrant | |
| 9,875,741 B2 | 1/2018 | Gelfenbeyn et al. | |
| 9,934,658 B1 * | 4/2018 | Field ....................... G10L 15/22 | |
| 10,031,722 B1 | 7/2018 | Mutagi et al. | |
| 10,079,021 B1 | 9/2018 | Barra Chicote et al. | |
| 10,147,441 B1 | 12/2018 | Pogue et al. | |
| 10,614,804 B2 * | 4/2020 | Kolavennu ............ G10L 15/22 | |
| 10,803,859 B1 * | 10/2020 | Williams ................ G10L 15/22 | |
| 2002/0069063 A1 | 6/2002 | Buchner et al. | |
| 2003/0093272 A1 | 5/2003 | Soufflet et al. | |
| 2003/0093281 A1 * | 5/2003 | Geilhufe ................. G10L 13/00 | 704/275 |
| 2003/0185358 A1 * | 10/2003 | Sakamoto ............... G10L 15/26 | 379/102.01 |
| 2003/0187659 A1 | 10/2003 | Cho et al. | |
| 2004/0193603 A1 | 9/2004 | Ljubicich | |
| 2005/0149496 A1 | 7/2005 | Mukherjee et al. | |
| 2005/0275505 A1 * | 12/2005 | Himmelstein .......... G10L 15/26 | 340/5.8 |
| 2006/0106499 A1 * | 5/2006 | Roosli ..................... G05B 9/02 | 700/276 |
| 2007/0176739 A1 * | 8/2007 | Raheman ........... G07C 9/00904 | 340/5.64 |
| 2007/0288129 A1 | 12/2007 | Komer et al. | |
| 2008/0147397 A1 | 6/2008 | Konig et al. | |
| 2008/0278007 A1 * | 11/2008 | Moore .................... G10L 15/26 | 307/116 |
| 2010/0030734 A1 | 2/2010 | Chunilal | |
| 2010/0286985 A1 | 11/2010 | Kennewick et al. | |
| 2012/0059658 A1 | 3/2012 | Sejnoha et al. | |
| 2012/0232886 A1 | 9/2012 | Capuozzo et al. | |
| 2013/0031476 A1 | 1/2013 | Coin et al. | |
| 2013/0229259 A1 * | 9/2013 | Huang ............... G07C 9/00563 | 340/5.52 |
| 2014/0223465 A1 | 8/2014 | Hatambeiki et al. | |
| 2014/0033056 A1 | 11/2014 | Venkatesha et al. | |
| 2014/0330435 A1 | 11/2014 | Stoner et al. | |
| 2014/0330569 A1 * | 11/2014 | Kolavennu ............. G10L 15/22 | 704/275 |
| 2014/0379323 A1 | 12/2014 | Anastasakos et al. | |
| 2015/0088518 A1 | 3/2015 | Kim et al. | |
| 2015/0162006 A1 * | 6/2015 | Kummer ................. G10L 17/22 | 704/275 |
| 2015/0199863 A1 * | 7/2015 | Scoggins ........... G07C 9/00904 | 340/5.25 |
| 2015/0277681 A1 | 10/2015 | Isaacson et al. | |
| 2015/0326701 A1 * | 11/2015 | Robfogel ............. H04L 12/2829 | 379/93.23 |
| 2015/0348551 A1 | 12/2015 | Gruber et al. | |
| 2015/0364135 A1 * | 12/2015 | Kolavennu ............. G10L 15/20 | 704/231 |
| 2016/0249220 A1 * | 8/2016 | Vaswani .................. G07C 9/22 | |
| 2016/0335264 A1 | 11/2016 | Behal et al. | |
| 2017/0024465 A1 | 1/2017 | Yeh et al. | |
| 2017/0041146 A1 * | 2/2017 | Davis ..................... H04L 9/0872 | |
| 2017/0116561 A1 | 4/2017 | Saddler et al. | |
| 2017/0122613 A1 | 5/2017 | Sinha et al. | |
| 2017/0161268 A1 | 6/2017 | Badaskar | |
| 2017/0193720 A1 * | 7/2017 | Eyring ............... G07C 9/00904 | |
| 2017/0352213 A1 * | 12/2017 | Bowie ................ G07C 9/00904 | |
| 2018/0063249 A1 | 3/2018 | Nguyen | |
| 2018/0165061 A1 | 6/2018 | Nicolich-Henkin et al. | |
| 2018/0342021 A1 | 11/2018 | Gulec | |
| 2019/0081811 A1 | 3/2019 | Miller et al. | |
| 2019/0180215 A1 | 6/2019 | Mukundala | |
| 2019/0245978 A1 | 8/2019 | Warrrick | |

OTHER PUBLICATIONS

PCTUS2018014930 International Search Report and Written Opinion, (dated May 8, 2018).
The European Search Report for EP Application No. 14165437.6, dated Aug. 7, 2014.
Dreilinger et al., "Experiences with Selecting Search Engines Using Metasearch," ACM Transactions on Information Systems, vol. 15, No. 3, pp. 195-222, Jul. 1997.
http://federatedsearchblog.com/2009/01/30/steven-bell-on-the-future-of-federated-search/, "Steven Bell on the Future of Federated Search," 3 pages, printed Feb. 7, 2017.
https://en.wikipedia.org/wiki/Federated_search, "Federated Search, From Wikipedia, the Free Encyclopedia," 4 pages, printed Feb. 7, 2017.
https://en.wikipedia.org/wiki/Search_aggregator, "Search Aggregator, From Wikipedia, the Free Encyclopedia," 2 pages, printed Mar. 27, 2017.

* cited by examiner

| User Story #1 Guest Welcoming |
|---|
| As a guest, I should be greeted by the room automation system (e.g. Lyric) upon first entry of the guestroom with a welcome message and actuation of the system per system specification.
Example room automation system welcome Message:
*"Welcome to your suite room here at Wynn Resorts Mr. Smith. My name is Lyric, and I am here to make your stay memorable. If there is anything I can do for you, such as turn on or off the lights, or call room service, just ask me. For example say "Lyric turn on all lights" or "Lyric call room service". Enjoy your stay!"* |

Figure 2

User Story #2 First Impressions

To increase adoption of the voice controlled room automation system, the room automation system should provide a reminder upon first interaction with four main guestroom control functions (lighting, HVAC, amenities, and drape).

As a guest, I should be gently advised upon first manual interaction with the thermostat, lighting, drapery and amenity controls, that voice automation is also available.

- *When the user increments or decrements the temperature by manually pressing the up or down button on the thermostat, the* room automation system *shall respond:*
  - *A: "OK, temperature is set to (incremented or decremented temperature) 64 degrees Fahrenheit. Let me know if there is anything else I can assist you with.*
- *When the user turns on or turns off the lights in the guestroom the* room automation system *shall respond:*
  - *A: "OK, the lights have been turned off. Let me know if there is anything else I can assist you with."*

As a guest, I should be able to interact with the room automation system in a way that allows the guest to provide input and receive feedback from the room automation system.

- *Q: "Lyric, what is the temperature in my room?"*
  - *A: "The current temperature in your room is 72 degrees. Would you like to make it cooler, or warmer?"*
  - *Guest: "Yes."*
  - *A: "OK. Cooler, or Warmer?*
  - *Guest: "Cooler"*
  - *A: "OK. Changing the temperature setting to 70 degrees."*
- *Q: "Lyric, is my room status set to private?"*
  - *A: "Yes. Your room status is set to private. The staff has been notified, and your doorbell has been disabled." Would you like me to change it?"*
  - *Guest: "Yes"*
  - *A: "OK". Your room status has changed. The staff has been notified, and your doorbell is enabled.*

Figure 3

| User Story #3 Two-Way Communication |
|---|
| As a user, I should be able to interact with the room automation system in a way that allows the guest to provide input and receive feedback from the the room automation system.<br>    ○ Q: *"Lyric, what is the temperature in my room?"*<br>            • A: *"The current temperature in your room is 72 degrees. Would you like to make it cooler, or warmer?"*<br>            • Guest: *"Cooler"*<br>            • A: *"OK. Changing the temperature setting to 70 degrees."*<br>    ○ Q: *"Lyric, is my room status set to private?"*<br>            • A: *"Yes. Your room status is set to private. The staff has been notified, and your doorbell has been disabled. Would you like me to change it?"*<br>            • Guest: *"Yes"*<br>            • A: *"OK". Your room status has changed. The staff has been notified, and your doorbell is enabled.* |

Figure 4

| User Story #4 Lighting Control |
|---|
| As a guest, I should have the option to turn on and off the lights in the guestroom, and receive an acknowledgement from the room automation system when the request has been received. |
| Example Voice Commands: |
|     o *"Lyric, turn all lights on"* |
|     o *"Lyric, turn all lights off"* |
|     o *"Lyric, make it brighter"* |
|     o *"Lyric, make it darker"* |
|     o *"Lyric, turn on all lights to 100%"* |
|     o *"Lyric turn on all lights to 50%"* |
|     o *"Lyric turn on all lights to 25%"* |
|     o *"Lyric dim all lights to 50%"* |
|     o *"Lyric dim all lights to medium" (same as 50%)* |
|     o *"Lyric dim all lights to 25%"* |
|     o *"Lyric dim all lights to low" (same as 25%)* |
|     o *"Lyric turn on room lights to 100%"* |
|     o *"Lyric turn on room lights to 50%"* |
|     o *"Lyric turn on room lights to 25%"* |
|     o *"Lyric dim room lights to 50%"* |
|     o *"Lyric dim room lights to medium" (same as 50%)* |
|     o *"Lyric dim room lights to 25%"* |
|     o *"Lyric dim room lights to low" (same as 25%)* |
|     o *"Lyric turn off room lights"* |
|     o *"Lyric, turn on bathroom lights"* |
|     o *"Lyric, turn off bathroom lights"* |
|     o *"Lyric, turn on nightlight"* |
|     o *"Lyric, turn off nightlight"* |
| • User can have control over the lighting of each zone, even when present in other zones. For instance, if the user is in the main room, the guest can turn on and off the bathroom lights. |
| *In all cases, Lyric may respond with "OK" to acknowledge the request, followed by the appropriate actuation.* |

Figure 5A

| System Function | | | | |
|---|---|---|---|---|
| Light Ctrl Dim Down | 0x0050 | 0=all 0x80cc | | Dim down either all lights (Param0=0) or a defined circuit cc. |
| Light Ctrl Dim Up | 0x0051 | 0=all 0x80cc | | Dim up either all lights (Param0=0) or a defined circuit cc. |
| Light Ctrl Dim Toggle | 0x0052 | 0=all 0x80cc | | Smartly toggles the lights up or down depending on the last operation. Toggles either all lights (Param0=0) or a defined circuit cc. |
| Light Ctrl Dim Stop | 0x0053 | 0x0000 | | Stops any ongoing dimming operation. |
| Light Ctrl Dim Set | 0x0054 | 0=all 0x80cc | 0xss00 | Set all the lights (Param0=0) or a defined circuit cc to a specific dimmed value ss (0-0xff = 0-100%) as defined in Param1. |
| Light Ctrl Scene Set | 0x0058 | 0x0000 | 0x0ss00 | Established light scene number ss (0-15) as defined in Param1. |
| Light Ctrl Scene Clear | 0x0059 | 0x0000 | 0x0ss00 | Dim down all lights that are part of light scene number ss (0-15) as defined in Param1. |

Figure 5B

| User Story #5 Thermostat Control |
|---|
| As a guest, I should have the ability to control the temperature of the thermostat and HVAC system, and receive an acknowledgement from the room automation system when the request has been received. The room automation system shall be able to control the thermostat in both Celsius and Fahrenheit modes. <br><br> Voice Commands: <br> o "Lyric, make it warmer" <br> o "Lyric, make it cooler" <br> o "Lyric, set the temperature to 72 degrees Fahrenheit" <br> o "Lyric, set the temperature to 22 degrees Celsius" <br> o "Lyric, turn off the thermostat" <br> o "Lyric, turn on the thermostat" <br> o "Lyric, turn on the air-conditioning" <br> o "Lyric, turn off the air-conditioning" <br> o "Lyric, turn on the heat" <br> o "Lyric, turn off the heat" <br> o "Lyric turn the fan off" <br> o "Lyric, turn the fan on" <br> o "Lyric, set the fan speed to low" <br> o "Lyric, set the fan speed to medium" <br> o "Lyric, set the fan speed to high" <br><br> *In all cases, Lyric shall respond with "OK" to acknowledge the request, followed by the appropriate actuation.* |

Figure 6A

| Thermostat System Function | | | |
|---|---|---|---|
| Set Fan Speed | 0x0042 | 0=off<br>1=low<br>2=medium<br>3=high | Controls the manual fan speed of the HVAC equipment in the guestroom. |
| Increment Target | 0x0043 | | Increments the target temperature by a defined step as if the thermostat's temperature up key would have been pressed. |
| Decrement Target | 0x0044 | | Decrements the target temperature by a defined step as if the thermostat's temperature down key would have been pressed. |
| Set Target Temperature | 0x003F | Display Temperature | Set the target temperature of the HVAC equipment. Changes the HVAC mode to AUTO. |
| C/F Control | 0x0040 | 0=Fahrenheit<br>1=Celsius<br>2=toggle | Controls the C/F display unit as available to the guest. |
| Set AC-Mode | 0x0041 | 0=off<br>1=fan only<br>2=fan fixed<br>3=auto | Controls the mode of the HVAC equipment in the guestroom. |

Figure 6B

| User Story #6 Drape Control |
|---|
| As a guest, I should have the ability to control the sheers and drapes in the guestroom, and receive an acknowledgement from the room automation system when the request has been received.<br><br>Voice Commands:<br><ul><li>"Lyric, open the drapes"</li><li>"Lyric, stop the drapes"</li><li>"Lyric, close the drapes"</li><li>"Lyric, open the sheers"</li><li>"Lyric, stop the sheers"</li><li>"Lyric, close the sheers"</li><li>"Lyric, open the curtains"</li><li>"Lyric, stop the curtains"</li><li>"Lyric, close the curtains"</li><li>"Lyric, open the blinds"</li><li>"Lyric, stop the blinds"</li><li>"Lyric, close the blinds"</li></ul>*In all cases, Lyric shall respond with "OK" to acknowledge the request, followed by the appropriate actuation.*<br><br>** Stop functionality may be dependent on system response time and latency. |

Figure 7A

| Drape System Function | | | |
|---|---|---|---|
| Drape Close | 0x0090 | 0=all<br>1..7=specific | Closes all or specific drapes / blinds / sheers. |
| Drape Open | 0x0091 | 0=all<br>1..7=specific | Opens all or specific drapes / blinds / sheers. |
| Drape Toggle | 0x0092 | 0=all<br>1..7=specific | Toggles the direction of all or specific drapes / blinds / sheers. |
| Drape Stop | 0x0093 | 0=all<br>1..7=specific | Stops all or specific drapes / blinds / sheers. |

Figure 7B

| User Story #7 Amenities Control |
| --- |
| As a guest, I should be able to set the room's privacy, make-up room status, and receive an acknowledgement from the room automation system when the request has been received.<br><br>Voice Commands:<br><br>• "Lyric, turn on privacy"<br>• "Lyric, set my room status to private"<br>• "Lyric, make my room private"<br>• "Lyric, I do not want to be disturbed"<br>• "Lyric, turn on do not disturb"<br>    ○ *In all cases, Lyric shall respond with "OK, your room status is now private. The hotel staff has been notified, and the doorbell has been disabled."*<br>• "Lyric, turn off privacy"<br>• "Lyric, turn off do not disturb"<br>    ○ *In all cases, Lyric shall respond with "OK, your room status is no longer private. The hotel staff has been notified, and the doorbell has been turned on."*<br>• "Lyric, turn on Make-up-Room"<br>    ○ "Lyric, turn on maid service"<br>    ○ "Lyric, my room is dirty"<br>    ○ "Lyric, my room needs to be cleaned"<br>    ○ "Lyric, call the maid"<br>        ▪ *In all cases, Lyric shall respond with "OK, you have requested that your room gets cleaned. The hotel staff has been notified."*<br>    ○ "Lyric, turn off maid service"<br>    ○ "Lyric, turn off make-up-room"<br>        ▪ *In all cases, Lyric shall respond with "OK, you have canceled your request to clean the room. The hotel staff has been notified."* |

Figure 8A

| Amenities System Function | | | |
|---|---|---|---|
| DND Ctrl | 0x0020 | 0=clear<br>1=set<br>2=toggle | Controlling of the Do-Not-Disturb Privacy status of the guestroom. |
| MUR Ctrl | 0x0021 | 0=clear<br>1=set<br>2=toggle | Controlling of the Make-Up R status of the guestroom. |

Figure 8B

User Story # 8 Eco Mode

Background:

Two examples are as follows:

The Guest presses the eco-mode button on the thermostat

- *Lyric responds with "Ok. Eco-mode has been enabled. Thank you for your participation in conserving our resources. Your thermostat is configured to reduce energy, and the maid staff has been notified that you've chosen to re-use the towels linens and bathroom amenities today."*

• "Lyric, set Eco-Mode"

- *Lyric responds with "Ok. Eco-mode has been enabled. Thank you for your participation in conserving our resources. Your thermostat is configured to reduce energy, and the maid staff has been notified that you've chosen to re-use the towels linens and bathroom amenities today."*

Figure 9A

| Echo Mode System Function | | | |
|---|---|---|---|
| ecoMode Ctrl | 0x0080 | 4=clear<br>12=set | Sets and clears the ecoMode function. Typically, leads to a 0x1004 attribute update. |

Figure 9B

| User Story # 9 Staff Use |
|---|

Maintenance worker enters an un-rented room on a daily maintenance check.

- "Lyric, provide me the equipment status for this room"
    - *Lyric shall respond with "Ok. There seems to be a problem. This room has not been connected to the network since Tuesday, December 20$^{th}$.*

*Or*

- *"Ok. There is an HVAC alarm reported. Recommend to change the air-filter.*

*Or*

- OK. The battery is low in the digital thermostat. Recommend to change the battery.

*Or*

- OK. The battery is low in the door lock. Recommend to change the battery.

*Or*

- OK. The motion sensor is not functioning. Recommend to check or replace it.

Example: Service Scenario

"Lyric, does the mini-bar need to be restocked"

*Or*

"Lyric, I finished cleaning the room." (notifies manager of clean room, to set room to rentable)

Figure 10

VOICE CONTROL OF AN INTEGRATED ROOM AUTOMATION SYSTEM

This application is a continuation of U.S. patent application Ser. No. 15/877,929, filed Jan. 23, 2018, and entitled "VOICE CONTROL OF AN INTEGRATED ROOM AUTOMATION SYSTEM", now U.S. Pat. No. 10,614,804 issued Apr. 7, 2020, which claims the benefit of and priority to U.S. Provisional Patent Application Ser. No. 62/449,968, filed on Jan. 24, 2017, titled "VOICE CONTROL OF AN INTEGRATED ROOM AUTOMATION SYSTEM", both of which are incorporated herein by reference.

BACKGROUND

The present disclosure relates to room automation systems, and more particularly, to voice control of room automation systems.

SUMMARY

The disclosure reveals systems and methods for providing voice control for a room automation system. In some instances, a room automation system is deployed in a guestroom of a hotel or the like, and includes a speaker device, such as a hands free speaker device. The speaker device may also include a microphone. The room automation system may include a web service that services voice commands received from a user via the speaker device. The web service may respond to the voice commands by, for example, providing requested information back to the user. In some cases, commands may be prefaced by a trigger phrase (e.g. "Hello Lyric", "Lyric", "Alexa", "OK, Google"), which in some cases may be programmable.

In some cases, the room automation system may be configured to help control one or more devices deployed in a guestroom of a hotel or the like, such as lights, Heating, Ventilation and/or Air Conditioning (HVAC) equipment, drapes, Audio/Visual equipment, Alarm clock, shower or bath water controller. These are just examples. The room automation system may be tied into a hotel automation controller, which may store guest information, check-in and check-out schedules, billing details, reservation schedules for in-house and/or local restaurants, spas, and/or other entertainment, requested wake-up calls, room status (e.g. occupied, not-occupied, do-not disturb), room maintenance status, room housekeeping status, and other information. In some cases, the room automation system may allow a user to use voice control to set the guest room status, make reservations at in-house and/or other restaurants, spas or other entertainment events, make transportation requests, and/or perform other functions or services.

In one example, the speaker device may be the Amazon Echo® hands free speaker device, which includes a speaker and microphone, and the web service may be the Alexa® Voice Service available from Amazon. The Alexa® Voice Service may be connected to and service the Echo hands free speaker device, and in some cases may provide capabilities, or skills, that enable a user to interact with the Echo hands free speaker device via voice commands to control a room automation system. When deployed in a guest room of a hotel, the Alexa® Voice Service may, for example, enable a user to interact with the Echo hands free speaker device via voice commands to request and receive information and/or to control devices in the guest room and/or request services of the hotel. In another example, the hands free speaker device may be the Google Home® hands free speaker device, and the web service may be the Google Home® Voice Service available from Google. The Google Home® Voice Service may be connected to and service the Google Home hands free speaker device, and in some cases may provide capabilities that enable a user to interact with the Google Home hands free speaker device to request and receive information and/or to control devices in the guest room and/or request services of the hotel. These are just example speaker devices and web services. It is contemplated that the speaker device and web service may be any suitable devices, including a proprietary speaker device and web service, such as a Honeywell branded speaker device and web service, such as under the Honeywell Lyric™ brand.

In some cases, the speaker device need not be a stand-alone device, but rather may be incorporated into another device such as a thermostat, a light bulb, a smoke detector and/or any other suitable device or devices. In some cases, the speaker may be included in one device, and the microphone may be included in another device. For example, the microphone may be included in a thermostat, and the speaker may be included in a music player, television or other suitable device. When so provided, the voice command (e.g., sometimes a trigger phrase, such as "Alexa", "Ok. Google", or "Hello Lyric", followed by voice command) may be received at one device (e.g. thermostat), and the response from the web-service may be heard back at a different device (e.g. music player or television).

In some cases, the web service that services the speaker device may communicate with a hotel automation controller. The hotel automation controller may communicate with one or more devices in the guest room, such as a thermostat, a door controller, a room scene control panel, an activity services control panel, and/or one or more device controllers such as a drapes/sheers controller, a lighting controller, an audio/visual controller, a shower or bath water controller, and/or any other suitable controller. In some instances, the speaker device may listen for a trigger phrase, such as Hi Lyric, followed by a voice command. This voice command may be passed to the web service, which may process the voice command using speech recognition, interpret the voice command and provide an appropriate response.

In some cases, the voice command is requesting information, such as "What is the weather forecast today?" or "What time does flight SW 1207 leave today?" In such instances, the web service may determine the requested information and then annunciate the requested information on the speaker device. In another example, the guest may request that certain music be played. The web service may identify the requested music (or radio program) and play the requested music on the speaker device in the guest room. In another example, the voice command may be requesting information that is best presented to the user in a visual format, such as a traffic map, city guides, TV channel guides, weather radar, hotel amenities such as information about dining and entertainment service, news, etc. In such instances, the web service may determine and communicate the requested information either directly, or through the hotel automation controller, for display on a tablet computer, a television and/or any other suitable device located in the guest room. In this example, the request may be received at the speaker device, and the response may be provided back to the user via a second device.

In some cases, the voice command may be requesting a change to the operation of one or more devices in the guest room. For example, a voice command may request that the temperature in the room be changed to 74 degrees. In other examples, the voice command may request that the lights be dimmed, the drapes/sheers be closed, the TV be turned on or the channel changed, and/or any other suitable request. In such instances, the web service may identify what is being requested, and may notify the hotel automation controller of the request. The hotel automation controller may then implement the request by, for example, sending a command to an appropriate controller in the guest room.

In some cases, the speaker device may be used to make telephone calls. For example, the guest may request "Please call American Airlines". The web service may receive this request from the speaker device and may identify the phone number for American Airlines. The web service may make the call directly via VOIP and use the speaker device as a speaker phone, or may pass the request to the hotel automation controller which may make the call. When the hotel automation controller makes the call, the call may be connected to the in-room phone system, or the hotel automation controller may be operatively connected to the speaker device to function as a speaker phone during the call.

In some cases, the web service may announce on the speaker device that the request has been implemented. For example, if a guests requests "Please close the drapes", the web service may process the request using voice recognition, identify what is being requested (i.e. close drapes), notify the hotel automation controller of the request to close the drapes, receive from the hotel automation controller that the drapes have been closed, and then announce on the speaker device "The drapes have been closed".

In some cases, the voice command may be requesting a service of the hotel. For example, a voice command may request room service, set the room to "do not disturb" status, set-up a wake-up call, request additional towels or pillows, request maintenance, request reservations at a restaurant, request tickets to a show, request a taxi, request checkout and/or any other suitable service request. In such instances, the web service may identify what is being requested, and may notify the hotel automation controller of the request. The hotel automation controller may fulfill the request. In some cases, the hotel automation controller may notify the web service that the request has been fulfilled along with any relevant details (e.g. if the request was for reservations, the hotel automation controller may notify the web service of the time of the reservation), and the web service may announce on the speaker device that the request has been fulfilled along with the relevant details.

In some cases, the hotel automation controller may initiate an announcement or query on the speaker device via the web service. In one example, the hotel automation controller may identify that a guest has checked into the hotel. The hotel automation controller may then enable the guest room for occupancy and wait for the guest to arrive at the guest room. The hotel automation controller may detect that the guest has arrived at the guest room when the user slides a guest room key in a guest room door controller. In response to the guest arrival after check-in, the hotel automation controller may send a command to the web service of the room automation system to make a welcome announcement via the speaker device. For example, the welcome announcement may welcome the guest and provide some basic instruction on how to use the voice commands of the room automation system, what can be controlled, special events that are occurring in the hotel, and/or any other welcome information. In another example, the hotel automation controller may store information about the guest's stay, such as the check-out date of the guest, reservations of the guest, and/or any other suitable information. The hotel automation controller may be configured to initiate and send appropriate commands to the web service to provide relevant information to the guest in a timely manner. For example, hotel automation controller may, on the morning of check-out, send appropriate commands to the web service to announce via the speaker device a summary of charges made by the guest during the stay, and describe the hotel's check-out procedure. In another example, the hotel automation controller may initiate and send appropriate commands to the web service to announce via the speaker device an upcoming reservation of the guest (e.g. at an in-house restaurant or spa), perhaps one-half hour before the reservation time. In another example, the hotel automation controller may initiate and send appropriate commands to the web service to announce via the speaker device that a request taxi has arrived. These are just examples.

In some cases, the hotel automation controller may control how to respond to a request based on who is present in the guest room. For example, the hotel automation controller may identify that a maintenance worker has entered a guest room when a maintenance worker's key card is read by the door controller of the guest room. The hotel automation controller may then be configured to respond to additional and/or different voice commands than when a guest has entered the guest room. For example, a maintenance worker may state "Please read me the alarm log for this room". The hotel automation controller may record an alarm/event log for each room, which may include alarms/events associated with equipment in the room such as a thermostat, a door controller, a room scene control panel, an activity services control panel, a drapes/sheers controller, a lighting controller, an audio/visual controller, a shower or bath water controller, and/or any other suitable controller. The alarm/event log may, for example, identify the HVAC status, room entry logs, room temperature logs, customer complaints, equipment failures such as a bad door open/close sensor, water leaks, communication errors and/or any other alarm or event. The speaker device may receive the voice command and may communicate the voice command to the web service. The web service may process the voice command using speech recognition, interpret the voice command and provide an appropriate command to the hotel automation controller. If the hotel automation controller detects that a maintenance worker is in the guest room, the hotel automation controller may switch to a service mode from a guest mode and provide the request alarm/event log to the web service. The web service may then report the event log using the speaker device. In this example, the hotel automation controller will not provide the request alarm/event log to the web service if a maintenance worker is not detected in the guest room. This way, guests will not have access to such information. In some cases, the hotel automation controller may switch to the service mode automatically when the room is not rented. In some cases, the hotel automation controller may enable different commands depending on who has entered the room. For example, the cleaning crew may have access to different commands than the maintenance crew, and the security personal may have access to different commands than the maintenance crew and cleaning crew. The general manager may have access to all commands.

In another example, the hotel automation controller may identify that a cleaning crew has entered a guest room when a cleaning worker's key card is read by the door controller. The hotel automation controller may then be configured to respond to additional and/or different voice commands than when a guest has entered the room. For example, a cleaning worker may state "Are there any special requests for this room". The hotel automation controller may record any special requests made by the guest, such as if the guest is enrolled in a water saving program of the hotel where sheets are only changed every other day. The speaker device may receive the voice command and may communicate the voice command to the web service. The web service may process the voice command using speech recognition, interpret the voice command and provide an appropriate command to the hotel automation controller. If the hotel automation controller detects that a cleaning worker is in the guest room, the hotel automation controller may switch to a service mode and provide the special request for the room to the web service. The web service may then report the special request using the speaker device. In this example, the hotel automation controller will not provide the special requests to the web service if a cleaning worker is not detected in the guest room.

In some cases, a speaker device may be provided in a kiosk or the like in the hotel lobby. When so provided, the speaker device, web service, and hotel automation controller may service guest check-in and check-out. The speaker device may prompt the guest to speak his name, reservation number and/or other identifying information. The speaker device may receive guest responses and provide the guest responses to the web service. The web service may process the responses using speech recognition, interpret the responses and provide appropriate information to the hotel automation controller. The hotel automation controller may check the information against a reservation database, assign a room, and complete the check-in process. For a guest without a reservation, the hotel automation controller may interact with the web-service to request additional information, assign a room, and complete the check-in process. In some cases, the web service and/or hotel automation controller may store guest preferences, such as room temperature, lighting scenes and the like. Upon check-in, the previously stored guest preferences may be automatically applied to the assigned guest room.

BRIEF DESCRIPTION OF THE DRAWINGS

FIG. 2 is a use case for the illustrative voice controlled room automation system of FIG. 1;

FIG. 3 is another use case for the illustrative voice controlled room automation system of FIG. 1;

FIG. 4 is another use case for the illustrative voice controlled room automation system of FIG. 1;

FIGS. 5A-5B show another use case for the illustrative voice controlled room automation system of FIG. 1;

FIGS. 6A-6B show another use case for the illustrative voice controlled room automation system of FIG. 1;

FIGS. 7A-7B show another use case for the illustrative voice controlled room automation system of FIG. 1;

FIGS. 8A-8B show another use case for the illustrative voice controlled room automation system of FIG. 1;

FIGS. 9A-9B show another use case for the illustrative voice controlled room automation system of FIG. 1; and FIG. 10 is another use case for the illustrative voice controlled room automation system of FIG. 1.

Figure 1:
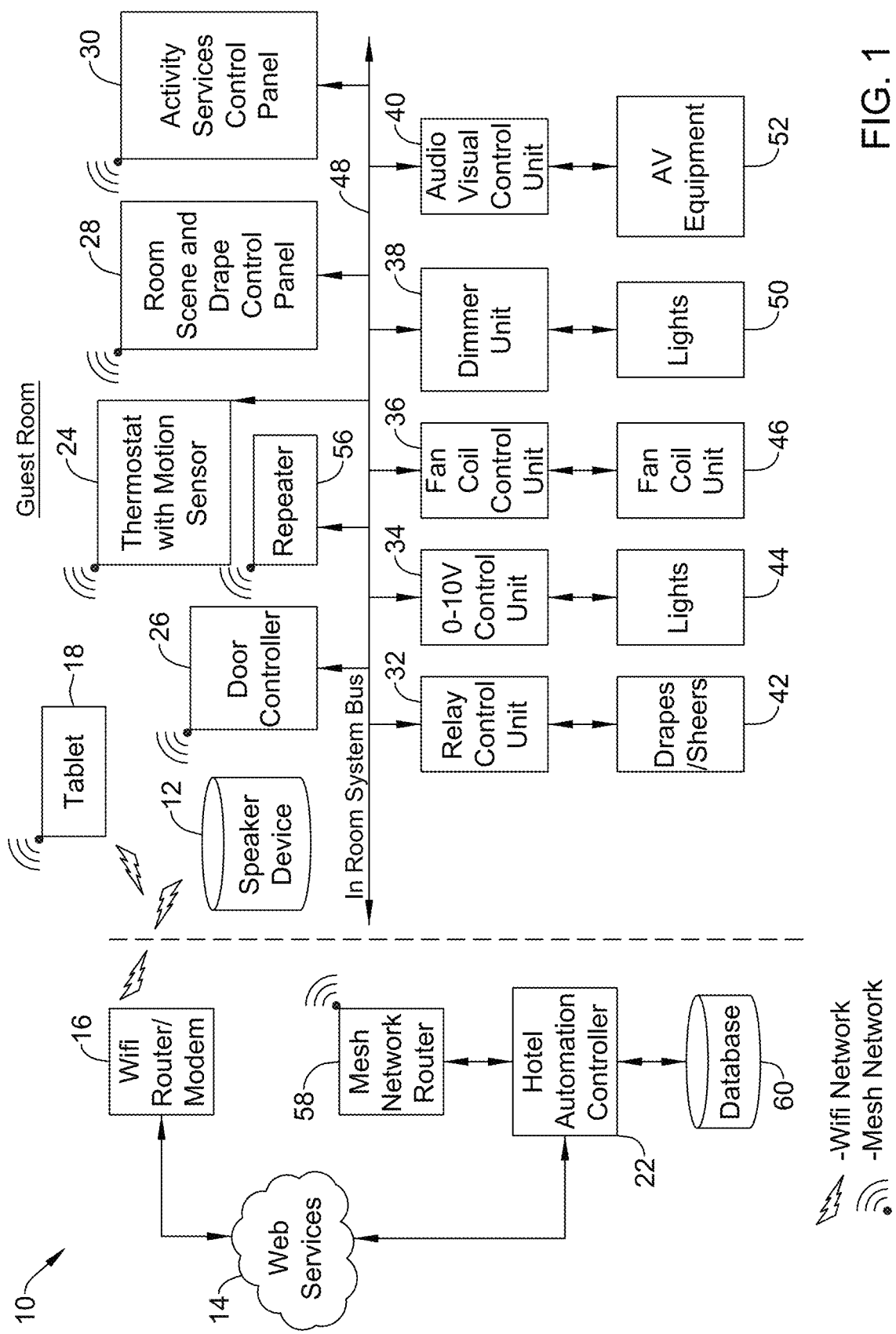
FIG. 1 is schematic block diagram of an illustrative voice controlled room automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is schematic block diagram of an illustrative voice controlled room automation system. The illustrative voice controlled room automation system is generally shown at 10. A guest room may include a speaker device 12. The speaker device 12 may be connected to a web service 14 via a WiFi router/modem 16 and the Internet. The web service 14 may service voice commands received from a guest via the speaker device 12. The web service 14 may respond to the voice commands by providing requested information back to the user via the speaker device 12 and/or via a tablet computer 18. In some cases, the web service may also be connected to a room automation system.

It is contemplated that the speaker device 12 may be the Amazon Echo® hands free speaker device, and the web service 14 may be the Alexa® Voice Service available from Amazon. The Alexa® Voice Service 14 may be connected to and service the Echo hands free speaker device 12, sometimes via the WiFi router/modem 16, and in some cases may provide capabilities, or skills, that enable a guest to interact with the Echo hands free speaker device 12 to control devices in the guest room. For example, the Alexa® Voice Service 14 may enable a guest to interact with the Echo hands free speaker device 12 to control devices in the guest room and/or request services of the hotel. In another example, the speaker device 12 may be the Google Home® hands free speaker device, and the web service 14 may be the Google Home® Voice Service available from Google. The Google Home® Voice Service 14 may be connected to and service the Google Home hands free speaker device 12, and in some cases may provide capabilities that enable a guest to request and receive information and/or to control devices in the guest room and/or request services of the hotel. These are just example speaker devices and web services. It is contemplated that the speaker device and web service may be any suitable devices, including a proprietary speaker device and web service, such as a Honeywell branded speaker device and web service, such as under the Honeywell Lyric™ brand.

In some cases, the speaker device 12 need not be a standalone device, but rather may be incorporated into another device such as a thermostat, a lighting control panel, a drape control panel, a scene control panel, a door controller, a light bulb, a smoke detector, and/or any other suitable device or devices. In some cases, the speaker of the speaker device 12 may be included in one device, and the microphone may be included in another device. For example, the microphone may be included in a thermostat, and the speaker may be included in a music player, a television or other suitable device. When so provided, the voice command (e.g., sometimes a trigger phrase, such as "Alexa", "Ok. Google", or "Hello Lyric", followed by voice command) may be received at one device (e.g. thermostat 24), and the response from the web service 14 may be heard back at a different device (e.g. music player or television of AV equipment 52).

In some cases, the web service 14 that services the speaker device 12 may communicate with a hotel automation controller 22. In some cases, the web service 14 is located remotely from the hotel automation controller 22. In some cases, the web service 14 is operatively connected to the hotel automation controller 22 via the Internet. In other cases, the web service 14 and the hotel automation controller 22 may be integrated together. In other cases, the hotel automation controller 22 may communicate with one or more devices in the guest room (e.g. send/receive information and/or control commands), such as a thermostat with a motion sensor 24, a door controller 26, a room scene and drape control panel 28, and/or an activity services control panel 30. These are just examples. In some cases, each of these devices may be operatively coupled to the hotel automation controller 22 via a wired or wireless network. In the example shown, the thermostat 24, door controller 26, room scene and drape control panel 28, activity services control panel 30, tablet 18 and repeater 56 are operatively coupled to the hotel automation controller 22 via a mesh network router 58. Also, the thermostat 24, the door controller 26, the room scene and drape control panel 28, and the activity services control panel 30 are shown operatively coupled to one or more device controllers via an in-room system bus 48. The in-room system bus 48, when provided, may connect the various devices as shown and may be a wired connection and/or a wireless connection, as desired. In FIG. 1, the in-room system bus 48 connects the thermostat 24, the door controller 26, the room scene and drape control panel 28, and the activity services control panel 30 to a relay control unit 32, a 0-10V control unit 34, a fan coil control unit 36, a dimmer control unit 38 and an audio/visual (AV) control unit 40.

The relay control unit 32 may include a number or relays that can be individually activated to turn on and off one or more pieces of equipment, such as a motor for opening/closing drapes/sheers 42. Some equipment may accept an analog input signal, such as an input signal that is between 0-10 Volts. For example, a lighting controller may accept an input signal between 0-10V, wherein a 0V input would turn the light off, a 5V input would turn the light on at 50% power, and a 10V input would turn the light on at 100% power. In FIG. 1, the 0-10V control unit 34 may be used to control such devices, such as lights 44. Fan coil control unit 36 may be used to control a fan coil HVAC unit 46. In some cases, the fan coil control unit 36 may receive commands from the thermostat 24 via an in-room system bus 48. The dimmer control unit 38 may control the dimming of lights 50, and the audio/visual (AV) control unit 40 may control audio/visual equipment 52, such as a television, music player or the like. The room may also include a shower or bath water controller, a doorbell controller, and/or any other suitable controller as desired.

During use, the speaker device 12 may receive a trigger phrase followed by a voice command from the guest. As noted above, the speaker device 12 need not be a standalone device. Rather, the speaker device 12 may be incorporated into another device such as the thermostat with a motion sensor 24, the door controller 26, the room scene and drape control panel 28, and/or the activity services control panel 30. These are just examples. Regardless, the received voice command may be passed to the web service 14, which may process the voice command using speech recognition, interpret the voice command and provide an appropriate response. In some cases, the speaker device 12 and web service 14 may support multiple trigger phrases. For example, a Honeywell speaker device 12 may recognize the trigger phrases "Lyric" or "Hi Lyric". The Honeywell speaker device 12 may be configured to also recognize trigger phrases like "Alexa" and "OK, Google". When so provided, the room automation system may be brand agnostic. As such, if the guest has the Amazon Alexa Voice Service or the Google Home Voice Service in their home, the guest can use the same trigger phrase, and some of the similar commands, that they are accustomed to using in their home.

In some cases, the voice command may be requesting information, such as "What is the weather forecast today?" or "What time does flight SW 1207 leave today?" In such instances, the web service 14 may determine and then annunciate the requested information on the speaker device 12. In other cases, the voice command may be requesting information that is best presented to the user in a visual format, such as a traffic map, city guides, TV channel guides, weather radar, etc. In such instances, the web service 14 may determine and communicate the requested information either directly, or through the hotel automation controller 22, for display on the tablet computer 18, a television (e.g. AV equipment 52) and/or any other suitable device located in the guest room.

In some cases, the voice command may be requesting a change to the operation of one or more devices in the guest room. For example, a voice command may request that the temperature in the room be changed to 74 degrees. In other examples, the voice command may request that the lights be dimmed, the drapes/sheers be closed, the TV be turned on or the channel changed, and/or any other suitable request. In such instances, the web service 14 may identify what is being requested, and may notify the hotel automation controller 22 of the request. The hotel automation controller 22 may then implement the request by, for example, sending a command to an appropriate controller 24, 26, 28 and 30 in the guest room.

The room automation system may be configured to recognize voice commands that are not recognized by the system. These failed voice commands can be stored and processed to determine if enough guests are using the same or similar voice command in an attempt to perform a certain function in the guest room. If so, the web service 14 may be updated to include the voice command, and to associate the voice command with the desired function. This update can be accomplished manually or automatically. In one example, if a guest states "Lyric, open curtains", and the system fails to recognize the command "open curtains", the system will fail to open the curtains. In many cases, the guest will recognize that the voice command failed, and will go to the Room Scene and Drape Control Panel 28 to manually press a button or the like to open the curtains. The hotel automation controller 22 may be notified that the voice command "open curtains" was received and was not recognized by the web service 14, and that soon thereafter the guest used the Room Scene and Drape Control Panel 28 to open the curtains. If enough guests in the hotel (or other connected hotels) use the same or similar unrecognized voice command, followed by performing the same function (e.g. activating the Room Scene and Drape Control Panel 28 to open the curtains), the room automation system may add the unrecognized voice command "Open Curtains" to the web service 14 and associate that voice command with the corresponding function (e.g. opening the curtains in the guest room). In this way, the room automation system may self-learn new voice commands.

In some cases, the speaker device 12 may be used to make telephone calls. For example, the guest may request "Please call American Airlines". The web service 14 may receive this request from the speaker device 12 and may identify the phone number for American Airlines. The web service 14 may make the call directly via VOIP and use the speaker device 12 as a speaker phone, or may pass the request to the hotel automation controller 22 which may make the call. When the hotel automation controller makes the call, the call may be connected to the in-room phone (not shown), or the hotel automation controller 22 may be operatively connected to the speaker device 12 to function as a speaker phone during the call.

In some cases, the speaker device 12 may function as a door bell. When so provided, the hotel automation controller 22 may be operatively coupled to a door bell outside of the guest room. When the door bell is pressed by a visitor, the hotel automation controller 22 may notify the web service 14, and in response, the web service 14 may announce on the speaker device 12 that a visitor is waiting at the door. The speaker device 12 may annunciate "You have a visitor at the front door".

In some cases, the web service 14 may announce on the speaker device 12 that the request has been implemented. For example, if a guest requests "Please close the drapes", the web service 14 may process the request using voice recognition, identify what is being requested (i.e. close drapes), notify the hotel automation controller 22 of the request to close the drapes, receive from the hotel automation controller 22 that the drapes have been closed, and then announce on the speaker device 12 "The drapes have been closed".

In some cases, the voice command may be requesting a service of the hotel. For example, a voice command may request room service, set the room to "do not disturb" status, set-up a wake-up call, request additional towels or pillows, request maintenance, request reservations at a restaurant, request tickets to a show, request a taxi, request checkout and/or any other suitable service request. In such instances, the web service 14 may identify what is being requested, and may notify the hotel automation controller 22 of the request. The hotel automation controller 22 may fulfill the request. In some cases, the hotel automation controller 22 may notify the web service 14 that the request has been fulfilled along with any relevant details (e.g. if the request was for reservations, what time the reservation was made), and the web service 14 may announce on the speaker device 12 that the request has been fulfilled along with the relevant details.

In some cases, the hotel automation controller 22 may initiate an announcement or query on the speaker device 12 via the web service 14. In one example, the hotel automation controller 22 may identify that a guest has checked into the hotel. The hotel automation controller 22 may then enable the guest room for occupancy and wait for the guest to arrive at the guest room. The hotel automation controller 22 may detect that the guest has arrived at the guest room when the user slides a guest room key in a guest room door controller 26. In response to the guest arrival after check-in, the hotel automation controller 22 may send a command to the web service 14 to make a welcome announcement via the speaker device 12. For example, the welcome announcement may welcome the guest and provide some basic instruction on how to use the voice commands, what can be controlled, special events that are occurring in the hotel, and/or any other welcome information. In some cases, the hotel automation controller 22 may send a text based message to the web service 14 for playing on the speaker device 12, wherein the web service 14 may convert the text based message into a voice message and transmit the voice message to the speaker device 12 for playing on the speaker device 12. In another example, the hotel automation controller 22 may store information about the guest's stay, such as the check-out date of the guest, reservations of the guest, and/or any other suitable information. The hotel automation controller 22 may be configured to initiate and send appropriate commands to the web service 14 to provide relevant information to the guest in a timely manner. For example, hotel automation controller 22 may, on the morning of check-out, send appropriate commands to the web service 14 to announce via the speaker device 12 a summary of charges made by the guest during the stay, and describe the hotel's check-out procedure. In another example, the hotel automation controller 22 may initiate and send appropriate commands to the web service 14 to announce via the speaker device 12 an upcoming reservations of the guest, perhaps one-half hour before the reservation. In another example, the hotel automation controller 22 may initiate and send appropriate commands to the web service 14 to announce via the speaker device 12 that a request taxi has arrived. These are just examples.

In some cases, the web service 14 and/or hotel automation controller 22 may store guest preferences, such as room temperature, lighting scenes and the like. Upon check-in, the previously stored guest preferences may be automatically applied to the assigned guest room. In some cases, if the guest has an existing Honeywell, Amazon, Google or other account, it is contemplated that guest preferences may be associated with that account. Such preferences may include, for example, day and night room temperature, day and night fan settings, day and night lighting scenes, day and night drape positions, eco-mode preferences, favorite television channels (e.g. CBS, NBC, FOX, etc.), restaurant types, vernacular, language, and/or any other suitable preference. Then, when making a reservation for example, the guest may link their account to their reservation, and their preferences may be propagated to the hotel automation controller 22 and ultimately to the various controllers in the assigned guest room.

In hospitality applications, as opposed to residential applications, the user is not a guru consumer, but is a guest entering a new space for the first time that is not their own, and the assumption must consider that the guest does not know anything about the guestroom automation or voice control, and may or may not have interest or intent to use it. The average guests stay in a hotel room is 1.4 days, and neither the guest nor the hotel want the guest to spend time in the guestroom learning how to use the guestroom automation or voice control, as this is time better spent enjoying the stay, or time better spent towards other revenue driving activities. Any kind of learning curve required to operate the system can lead to an un-satisfactory guest experience, and often a complaint to the front desk. Also, it would be undesirable to provide an instruction card or plaque on the wall in the room with instructions on how to use the system. Thus, increasing the guest satisfaction, the voice control system should be setup to help with early adoption by the guest, with simple and reliable operation that provides the guest with real value.

FIG. 2 shows a use case for the illustrative voice controlled room automation system of FIG. 1. In FIG. 2, the guest is greeted with a welcome message via the speaker device 12 upon initially entering the room after check-in. Upon first entry, the room automation system should introduce itself to the guest by name, and provide a high level summary of the room automation system, services it provides, and its convenient features. This provides the guest with an introduction, and communicates to the guest that a voice automation system is available for use.

In one example, the hotel automation controller 22 may identify that a guest has checked into the hotel. The hotel automation controller 22 may then enable the guest room for occupancy and wait for the guest to arrive at the guest room. The hotel automation controller 22 may detect that the guest has arrived at the guest room when the user slides a guest room key in a guest room door controller 26. In response to the guest arrival after check-in, the hotel automation controller 22 may send a command to the web service 14 to make a welcome announcement via the speaker device 12. For example, the welcome announcement may welcome the guest and provide some basic instruction on how to use the voice commands, what can be controlled, special events that are occurring in the hotel, and/or any other welcome information. In the example shown in FIG. 2, the welcome message may be "Welcome to your suite room here at Wynn Resorts, Mr. Smith. My name is Lyric, and I am here to make your stay memorable. If there is anything I can do for you, such as turn on or off the lights, or call room service, just ask me. For example say 'Lyric turn on all lights' or 'Lyric call room service'. Enjoy your stay".

FIG. 3 shows another use case for the illustrative voice controlled room automation system of FIG. 1. In this use case, the room automation system provides an audible reminder upon first manual interactions with a control point that has a voice control option. For example, the room automation system may provide an audible reminder upon first manual interactions with the guestroom thermostat, light controls, drape controls, and/or other amenity functions that have a voice control option, to re-inforce the guest interaction with the voice control system. This gentle reminder after the first manual interaction with the guestroom devices provides a subtle reminder and instruction on how to use the room automation system. In FIG. 3, the system provides reminders via the speaker device 12 that voice automation is available when the guest manually interacts with the thermostat 24, room scene and drape control panel 28, and/or an activity services control panel 30. This may help the guest understand the full capabilities of the room automation system. For example, when a guest increments or decrements the temperature by manually pressing the up or down button on the thermostat 24, the hotel automation controller 22 may be notified. In response, the hotel automation controller 22 may instruct the web service 14 to annunciate via the speaker device 12 "OK, temperature is set to 64 degrees Fahrenheit. Let me know if there is anything else I can assist you with". Likewise, when a guest turns on or turns off the lights, the hotel automation controller 22 may be notified. In response, the hotel automation controller 22 may instruct the web service 14 to annunciate via the speaker device 12 "OK, the lights have been turned off. Let me know if there is anything else I can assist you with."

Also, it is contemplated that the system may be configured to interact with the guest in a way that allows the guest to provide input and receive feedback. For example, the web service 14 and hotel automation controller 22 may be configured such that the guest may interact with the system in a two-way conversational manner, such as:

Guest: "Lyric, what is the temperature in my room?"
    A: "The current temperature in your room is 72 degrees. Would you like to make it cooler, or warmer?"
    Guest: "Yes,"
    A: "OK Cooler, or Warmer?
    Guest: "Cooler"
    A: "OK. Changing the temperature setting to 70 degrees."

Another example is as follows:
    Guest: "Lyric, is my room status set to private?"
    A: "Yes. Your room status is set to private. The staff has been notified, and your doorbell has been disabled." Would you like me to change it?"
    Guest: "Yes"
    A: "OK". Your room status has changed. The staff as been notified, and your doorbell is enabled.

FIG. 4 shows another use case for the illustrative voice controlled room automation system of FIG. 1. The use case in FIG. 4 is another example of a guest interacting with the system in a two-way conversational manner, as follows:

Guest. "Lyric, what is the temperature in my room?"
    A: "The current temperature in your room is 72 degrees. Would you like to make it cooler, or warmer?"
    Guest: "Cooler"
    A: "OK. Changing the temperature setting to 70 degrees."
    Guest: "Lyric, is my room status set to private?"
    A: "Yes. Your room status is set to private. The staff has been notified, and your doorbell has been disabled. Would you like me to change it?"
    Guest: "Yes"
    A: "OK". Your room status has changed. The staff has been notified, and your doorbell is enabled.

FIGS. 5A-5B show another use case for the illustrative voice controlled room automation system of FIG. 1. FIG. 5A shows example voice commands for use in controlling the lighting in the guest room. As can be seen, different voice commands may be used to achieve a desired result. The web service 14 is configured to receive the voice command from the speaker device 12, process the voice command using speech recognition, and then interpret the meaning of the voice command. The web service 14 may then send an appropriate command to the hotel automation controller 22 to achieve the desired result. Note, in this use case, the web service 14 interprets "Lyric, turn all lights off" and "Lyric turn off room lights" to mean the same thing, and will provide the same command to the hotel automation controller 22 to turn all lights off in the guest room. After the hotel automation controller 22 has carried out the desired request, the web service 14 may annunciate an acknowledgement to the guest via the speaker device 12 that the request has been completed.

FIG. 5B show illustrative system functions that may be used for carrying out the lighting control in a guest room. An appropriate system function may be identified by the web service 14 based on the received voice command, and that system function may be passed to the hotel automation controller 22. The hotel automation controller may send a corresponding command to the room scene and drape control panel 28, which may carry out the commanded function.

FIGS. 6A-6B show another use case for the illustrative voice controlled room automation system of FIG. 1. FIG. 6A shows example voice commands for use in controlling the HVAC system in the guest room. The web service 14 is configured to receive the voice command from the speaker device 12, process the voice command using speech recognition, and then interpret the meaning of the voice command. The web service 14 may then send an appropriate command to the hotel automation controller 22 to achieve the desired result. Note, in this use case, the web service 14 can interpret commands to change the temperature in the guest room, control the fan speed, and control other HVAC functions. After the desired command is carried out by the hotel automation controller 22, the web service 14 may annunciate an acknowledgement to the guest via the speaker device 12 that the request has been completed.

FIG. 6B shows illustrative system functions that may be used for carrying out the HVAC control in a guest room. An appropriate system function may be identified by the web service 14 based on the received voice command, and that system function may be passed to the hotel automation controller 22. The hotel automation controller 22 may send a corresponding command to the thermostat 24, which may carry out the commanded function.

FIGS. 7A-7B show another use case for the illustrative voice controlled room automation system of FIG. 1. FIG. 7A shows example voice commands for use in controlling the Drapes in the guest room. The web service 14 is configured to receive the voice command from the speaker device 12, process the voice command using speech recognition, and then interpret the meaning of the voice command. The web service 14 may then send an appropriate command to the hotel automation controller 22 to achieve the desired result. Note, in this use case, the web service 14 can interpret commands to change the position of the drapes, sheers and/or blinds in the guest room. After the desired command is carried out by the hotel automation controller 22, the web service 14 may annunciate an acknowledgement to the guest via the speaker device 12 that the request has been completed.

FIG. 7B shows illustrative system functions that may be used for carrying out the drape, sheer and/or blind control in a guest room. An appropriate system function may be identified by the web service 14 based on the received voice command, and that system function may be passed to the hotel automation controller 22. The hotel automation controller 22 may send a corresponding command to the room scene and drape control panel 28, which may carry out the commanded function.

FIGS. 8A-8B show another use case for the illustrative voice controlled room automation system of FIG. 1. FIG. 8A shows example voice commands for use in controlling amenities associated with the guest room. The web service 14 is configured to receive the voice command from the speaker device 12, process the voice command using speech recognition, and then interpret the meaning of the voice command. The web service 14 may then send an appropriate command to the hotel automation controller 22 to achieve the desired result. Note, in this use case, the web service 14 can interpret commands to set a privacy status and/or request maid service for the guest room. After the desired command is carried out by the hotel automation controller 22, the web service 14 may annunciate an acknowledgement to the guest via the speaker device 12 that the request has been completed.

FIG. 8B show illustrative system functions that may be used for carrying out the drape, sheer and/or blind control in a guest room. An appropriate system function may be identified by the web service 14 based on the received voice command, and that system function may be passed to the hotel automation controller 22.

FIGS. 9A-9B show another use case for the illustrative voice controlled room automation system of FIG. 1. FIG. 9A shows example voice commands for use in controlling an eco-mode associated with the guest room. In some cases, guests can press an eco-mode button on the thermostat 24 or other control device to opt-in to the hotel's conservation program. In addition to instantly triggering the room automation system's energy-saving mode (e.g. widens the temperatures set point control from +/−1 degree F. to +/−2 degrees F., changes the lighting scene, etc.), the eco-mode button can initiate the guest's participation in the hotel's sustainability programs, which may include, for example, reduced linen changes and bath amenity replacements.

It is contemplated that the eco-mode may be activated under voice control. In some cases, the room automation system may explain the eco-mode via the speaker device 12 when the guest first enters the room after check-in, such as during the guest welcome greeting (see FIG. 2). The room automation system may notify the guest of what environmentally friendly programs are available. This information may also be provided via the speaker device 12 upon first activating the Eco-mode button.

Two examples of activating the eco-mode for the guest room are shown in FIG. 9A. In the first example, the guest presses an eco-mode button on the thermostat. This is detected by the hotel automation controller 22. The hotel automation controller 22 then commands the web service 14 to annunciate on the speaker device 12 "Ok. Eco-mode has been enabled. Thank you for your participation in conserving our resources. Your thermostat is configured to reduce energy, and the maid staff has been notified that you've chosen to re-use the towels linens and bathroom amenities today." In the second example, the guest states to the speaker device 12, "Lyric, set Eco-Mode". The speaker device recognizes the trigger phrase "Lyric" and passes the command "set Eco-Mode" to the web service 14. The web service 14 identifies the corresponding command (e.g. see FIG. 9B) to send to the hotel automation controller 22. The hotel automation controller 22 then sets the guest's room to eco-mode, and notifies the web service 14 that the eco-mode has been set. The web service 14 then annunciates via the speaker device 12 "Ok. Eco-mode has been enabled. Thank you for your participation in conserving our resources. Your thermostat is configured to reduce energy, and the maid staff has been notified that you've chosen to re-use the towels linens and bathroom amenities today."

In some cases, the hotel automation controller 22 may control how to respond to a request based on who is present in the guest room. For example, the hotel automation controller 22 may identify that a maintenance worker has entered a guest room when a maintenance worker's key card is read by the door controller 26. The hotel automation controller 22 may then be configured to respond to additional and/or different voice commands than when a guest has entered the room. For example, a maintenance worker may state "Please read me the alarm log for this room". The hotel automation controller 22 may record an alarm/event log for each room. The alarm/event log may include alarms/events associated with equipment in the room such as the thermostat 24, the door controller 26, the room scene control panel 28, the activity services control panel 30, the drapes/sheers controller 32, the lighting controller 34, the audio/visual controller 40, and/or any other suitable controller or equipment. The alarm/event log may, for example, identify the HVAC status, room entry logs, room temperature logs, customer complaints, equipment failure such as a bad door sensor, water leaks, communication errors and/or any other alarm or event. The speaker device 12 may receive the voice command and may communicate the voice command to the web service 14. The web service 14 may process the voice command using speech recognition, interpret the voice command and provide an appropriate command to the hotel automation controller 22. If the hotel automation controller 22 detects that a maintenance worker is in the guest room, the hotel automation controller 22 may switch to a service mode and provide the request alarm/event log to the web service 14. The web service may then report the event log using the speaker device 12. In this example, the hotel automation controller 22 will not provide the request alarm/event log to the web service 14 if a maintenance worker is not detected in the guest room. This way, guests will not have access to such information. In some cases, the hotel automation controller 22 may switch to the service mode automatically when the room is not rented, and may default to a guest mode when the room is rented.

In another example, the hotel automation controller 22 may identify that a cleaning crew has entered a guest room when a cleaning worker's key card is read by the door controller 26. The hotel automation controller 22 may then be configured to respond to additional and/or different voice commands than when a guest has entered the room. For example, a cleaning worker may state "Are there any special requests for this room". The hotel automation controller 22 may record any special requests made by the user, such as if the guest is enrolled in the water saving program of the hotel where sheets are only changed every other day. The speaker device 12 may receive the voice command and may communicate the voice command to the web service 14. The web service 14 may process the voice command using speech recognition, interpret the voice command and provide an appropriate command to the hotel automation controller 22. If the hotel automation controller 22 detects that a cleaning worker is in the guest room, the hotel automation controller 22 may switch to a service mode and forward the special request for the room to the web service 14. The web service 14 may then report the special request to the cleaning worker using the speaker device 12. In this example, the hotel automation controller 22 will not provide the special requests to the web service 14 if a cleaning worker is not detected in the guest room.

FIG. 10 is another use case for the illustrative voice controlled room automation system of FIG. 1. FIG. 10 shows example voice commands that may be used by hotel workers or staff in the guest room. In some cases, the hotel automation controller 22 has the capability of determining who is the in the guest room, such as a guest or staff. This can be done based on the rental and occupancy status of the guest room, or by key card identification when the room automation system has or is connected to a Centrally Electronic Controlled Locking System (CELS) such as Timelox™ or Saflok™. With this information, the room automation system can tailor the messages and responses that are appropriate for staff when staff is in the room. In some cases, the hotel automation controller 22 may have access to real-time room status information such as Room and property energy trend data, Alarm reports for malfunctioning equipment—Instant control of temperature setback parameters and other system settings, Online diagnostic/preventive maintenance and other useful tools to assist staff in understanding the current status of the equipment's operation in the guest room.

An example of how such a system may interact with a maintenance worker is shown in FIG. 10. The maintenance worker may enter the room and ask "Lyric, provide me the equipment status for this room". The system may response via the speaker device 12 by, for example: "Ok. There seems to be a problem. This room has not been connected to the network since Tuesday, December $20^{th}$", or "Ok. There is an HVAC alarm reported. Recommend to change the air-filter", or "OK. The battery is low in the digital thermostat. Recommend to change the battery", or "OK. The battery is low in the door lock. Recommend to change the battery", or "OK. The motion sensor is not functioning. Recommend to check or replace it".

In another example, a cleaning worker may enter the room and ask "Lyric, does the mini-bar need to be restocked", and the system may respond accordingly. Alternatively, the cleaning worker may state "Lyric, I finished cleaning the room." This may notify the hotel automation controller 22 that the room is clean and the room may be set to rentable. In some cases, the hotel automation controller 22 may automatically set the room as rentable. These are just examples.

In some cases, a speaker device 12 may be provided in a kiosk or the like in the hotel lobby. When so provided, the speaker device 12, web service 14, and hotel automation controller 22 may service guest check-in and check-out. The speaker device 12 may prompt the guest to speak his name, reservation number and/or other identifying information. The speaker device 12 may receive guest responses and provide the guest responses to the web service 14. The web service 14 may process the responses using speech recognition, interpret the responses and provide appropriate information to the hotel automation controller 22. The hotel automation controller 22 may check the information against a reservation database (e.g. database 60), assign a room, and complete the check-in process. For a guest without a reservation, the hotel automation controller 22 may interact with the web service 14 to request additional information if necessary, assign a room, and complete the check-in process.

In some cases, the room automation system may include a "mute" command. That is, a guest may state "Lyric, mute". When this command is received by the web service 14, the web service 14 may stop sending annunciations, instructions and/or other information to the speaker device 12. Alternatively, the speaker device 12 itself may be configured to recognize the "mute" command and turn off the speaker. It is contemplated that the communication between the speaker device 12 and the web services 14 may be duplex, such that the speaker device 12 may be delivering messages or other contents via the speaker while listing for commands using the microphone. Thus, if the user states "Lyric, mute" while the speaker device is delivering messages or other content, the web service 14 and/or speaker device 12 may stop delivering the messages and/or content midstream. There may also be an "unmute" command.

In some cases, the room automation system may include a "stop" command. That is, a guest may state "Lyric, stop". When this command is received by the web service 14, the web service 14 may stop sending the current annunciation, instruction and/or other information to the speaker device 12. This is different from the "mute" command because if the web service 14 receives another command from the speaker device 12 and/or the hotel automation controller 22, the web service 14 may initiate another annunciation, instruction and/or other information on the speaker device 12.

In some cases, the room automation system may include a "next" command. That is, a guest may state "Lyric, next". When this command is received by the web service 14, the web service 14 may skip to a next annunciation, instruction and/or message and to provide the next annunciation, instruction and/or message on the speaker device 12. In some cases, the room automation system may include a "back" command. That is, a guest may state "Lyric, back". When this command is received by the web service 14, the web service 14 may skip back to a previous annunciation, instruction and/or message and to provide the previous annunciation, instruction and/or message on the speaker device 12. These are just examples.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A voice controlled room automation system for controlling one or more components that support a room of a plurality of rooms of a building, the voice controlled room automation system configured to:
   detect that a person is in the room of the building, wherein detecting that the person is in the room includes detecting a reading of a key card that is associated with the person;
   determine a particular category from a plurality of categories that the detected person belongs, wherein determining the particular category includes processing information read from the key card that is associated with the person;
   enable a plurality of commands, two or more of which are tailored to the particular category that the person belongs, each of the plurality of commands, when carried out, requests a different action to be performed by one or more components that support the room;
   receive a voice command from the detected person after arriving in the room and while in the room;
   process the voice command using speech recognition;
   interpret the voice command to determine a corresponding command for controlling operation of one or more components that support the room;
   determine if the corresponding command is one of the one or more enabled commands tailored to the particular category that the person belongs to;
   carry out the corresponding command when the corresponding command is one of the one or more enabled commands; and
   not carry out the corresponding command when the corresponding command is not one of the one or more enabled commands.

2. The voice controlled room automation system of claim 1, wherein the voice command is processed by a web service.

3. The voice controlled room automation system of claim 1, wherein a first category of the plurality of categories has more commands enabled than a second category of the plurality of categories.

4. The voice controlled room automation system of claim 1, wherein a first category of the plurality of categories has at least one command that is enabled that a second category of the plurality of categories does not have enabled.

5. A voice controlled room automation system for controlling one or more components that support a room of a plurality of rooms of a building, the voice controlled room automation system configured to:
   detect that a person is in the room of the building;
   determine a particular category from a plurality of categories that the detected person belongs to, wherein the plurality of categories include two or more of a cleaning personnel category, a maintenance personnel category, a security personnel category, a manager category, and a user category;
   enable a plurality of commands, two or more of which are tailored to the particular category that the person belongs, each of the plurality of commands, when carried out, requests a different action to be performed by one or more components that support the room;
   receive a voice command from the detected person after arriving in the room and while in the room;
   process the voice command using speech recognition;
   interpret the voice command to determine a corresponding command for controlling operation of one or more components that support the room;
   determine if the corresponding command is one of the one or more enabled commands tailored to the particular category that the person belongs to;
   carry out the corresponding command when the corresponding command is one of the one or more enabled commands; and
   not carry out the corresponding command when the corresponding command is not one of the one or more enabled commands.

6. A voice controlled room automation system for controlling one or more components that support a room of a plurality of rooms of a building, the voice controlled room automation system configured to:
   detect that a person is in the room of the building by detecting a reading of a device that is associated with the person;
   determine a particular category from a plurality of categories that the detected person belongs by processing information read from the device that is associated with the person, wherein the plurality of categories include two or more of a cleaning personnel category, a maintenance personnel category, a security personnel category, a manager category, and a user category;
   enable a plurality of commands, two or more of which are tailored to the particular category that the person belongs, each of the plurality of commands, when carried out, requests a different action to be performed by one or more components that support the room, wherein a first category of the plurality of categories has more commands enabled than a second category of the plurality of categories;
   receive a voice command from the detected person while in the room;
   process the voice command using speech recognition;

interpret the voice command to determine a corresponding command for controlling operation of one or more components that support the room;

determine if the corresponding command is one of the one or more enabled commands tailored to the particular category that the person belongs to;

carry out the corresponding command when the corresponding command is one of the one or more enabled commands; and not carry out the corresponding command when the corresponding command is not one of the one or more enabled commands.

7. The voice controlled room automation system of claim 6, wherein the voice command is processed by a web service.

8. The voice controlled room automation system of claim 6, the building is a hotel, and the room is a hotel room of the hotel.

* * * * *